(12) United States Patent
Yoshino

(10) Patent No.: US 6,464,307 B1
(45) Date of Patent: Oct. 15, 2002

(54) AUTOMOTIVE HYDRAULIC PRESSURE BRAKE SYSTEM

(75) Inventor: Masato Yoshino, Itami (JP)

(73) Assignee: Sumitomo (SEI) Brake Systems, Inc., Hisai (JP)

( * ) Notice: Subject to any disclaimer, the term of this patent is extended or adjusted under 35 U.S.C. 154(b) by 0 days.

(21) Appl. No.: 09/716,294

(22) Filed: Nov. 21, 2000

(30) Foreign Application Priority Data

| Nov. 24, 1999 | (JP) | 11-332495 |
| Nov. 24, 1999 | (JP) | 11-332652 |
| Nov. 24, 1999 | (JP) | 11-332660 |
| Aug. 28, 2000 | (JP) | 2000-256682 |
| Aug. 28, 2000 | (JP) | 2000-256697 |
| Aug. 28, 2000 | (JP) | 2000-256763 |

(51) Int. Cl.$^7$ ........................ B60T 13/138; B60T 13/66
(52) U.S. Cl. .................. 303/11; 303/116.2; 303/15; 303/115.4; 303/116.1
(58) Field of Search ................ 303/11, 15, 116.1, 303/116.2, 113.1, 115.4, 115.5, 900, DIG. 3, DIG. 4

(56) References Cited

U.S. PATENT DOCUMENTS

| 5,013,096 A | * | 5/1991 | Ocvirk et al. | |
| 5,368,374 A | | 11/1994 | Fujimoto | 303/113.2 |
| 5,375,506 A | | 12/1994 | Hashida et al. | 91/446 |
| 5,601,344 A | * | 2/1997 | Matsunaga et al. | 303/115.4 |
| 5,951,115 A | * | 9/1999 | Sakai et al. | 303/3 |
| 5,984,430 A | * | 11/1999 | Koga et al. | 303/116.1 |
| 6,132,015 A | * | 10/2000 | Aoyama | 303/152 |
| 6,164,734 A | * | 12/2000 | Otomo et al. | 303/122.1 |
| 6,195,995 B1 | * | 3/2001 | Bartsch | 60/564 |
| 6,283,558 B1 | * | 9/2001 | Volz et al. | 303/113.1 |

FOREIGN PATENT DOCUMENTS

| JP | 2590825 | | 1/1988 |
| JP | 1172053 A | * | 7/1989 |
| JP | 9-20229 | | 1/1997 |
| JP | 10-67311 | | 3/1998 |

* cited by examiner

Primary Examiner—Matthew C. Graham
Assistant Examiner—Melody M. Burch
(74) Attorney, Agent, or Firm—Greenblum & Bernstein, P.L.C.

(57) ABSTRACT

Automotive hydraulic pressure brake system with a stroke simulator is proposed which while the electric control system is functioning properly, the supply of hydraulic pressure from a master cylinder is cut off and hydraulic pressure is generated by a power pump. This improves response upon rapid pressure increase while minimizing the increase of pedal stroke and the worsening of the pedal feeling.

A bypass is provided to communicate the master cylinder to the wheel cylinders while bypassing an on-off valve to be closed during ordinary braking. A shut-off valve is provided in the bypass and a check valve or a relief valve for allowing only a fluid flow from the master cylinder toward the wheel brake cylinders is provided.

8 Claims, 6 Drawing Sheets

AUTOMOTIVE HYDRAULIC PRESSURE BRAKE SYSTEM

BACKGROUND OF THE INVENTION

This invention relates to an improved automotive hydraulic pressure brake system in which brake fluid pressure is ordinarily supplied from a pump as a main pressure source, but additional fluid pressure is supplied from a master cylinder when it is necessary to increase brake pressure at a rapid pace, such as for quick brake, at low temperature causing high brake fluid viscosity and upon pump performance degradation.

To optimally control the behavior of the vehicle, vehicle brake systems are increasing which can control the braking effect electrically. For example, the brake system disclosed in Japanese patent 2590825 has, besides a master cylinder for generating fluid pressure when a brake pedal is depressed, a fluid pressure source comprising a pump and an accumulator for supplying fluid pressure to the wheel cylinders in proportion to or independently of how much the brake pedal is depressed. But since such a system needs a bulky accumulator, it is difficult to mount the entire system in an engine room.

Devices for generating brake fluid with a pump only in increasing the wheel cylinder pressure by electronic control are proposed in Japanese patent publications 9-20229 and 10-67311. With these devices, if the passage between the master cylinder and the wheel cylinders is shut off, the entire amount of brake fluid necessary for braking has to be provided by the pump, so that a pump having a large capacity is needed. Also, a delay in the pressure rise during a rapid pressure increase will be a problem, and a longer braking distance will result.

Figure 7:
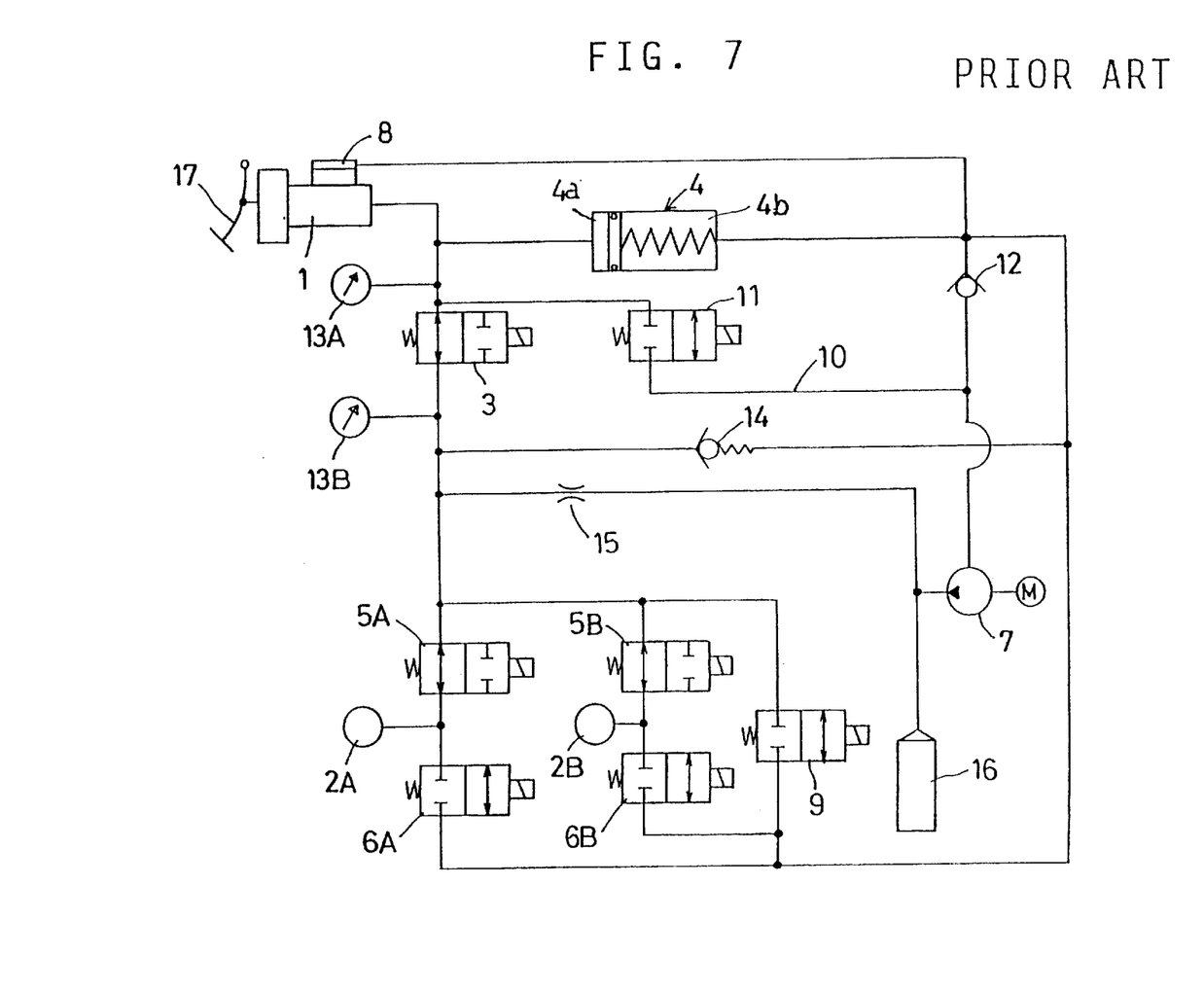
FIG. 7 is a circuit diagram of a conventional fluid pressure; brake system.

A brake system has been proposed which solves this problem. FIG. 7 is a basic circuit diagram of such a brake system. As shown, in lines connecting the master cylinder 1 to wheel cylinders 2A, 2B (letters A, B are sometimes omitted hereinbelow), an electromagnetic on-off valve 3 and a stroke simulator 4 are provided. This brake system further includes control valves (comprising pressure-increasing on-off valves 5A, 5B and pressure-reducing on-off valves 6A, 6B in this example) for controlling the wheel cylinder pressure based on command from an electronic control unit (ECU, not shown), an on-off valve 9 provided in a return line extending from the discharge port of a pump 7 (a hydraulic pump in this example) to a reservoir 8, a bypass 10 connecting the master cylinder 1 to the suction port of the pump 7, an on-off valve 11 provided in the bypass 10, and a check valve 12 provided in the return line to check a fluid flow from the bypass 10 to the reservoir 8. The on-off valves 5 and 6, which are used for antilock control, are not essential elements in this arrangement.

This brake system is also provided with fluid pressure sensors 13A, 13B, a relief valve 14 for preventing overpressure, a silencing throttle 15 and a silencer 16. Relief valve 14, throttle 15 and silencer 16 are used in this arrangement but are not essential elements.

The stroke simulator 4 has its back-pressure chamber 4b connected to the reservoir 8 to keep the chamber wet. It has a main chamber 4a.

In the arrangement of FIG. 7, in a normal state (i.e. while the electric control unit is functioning normally), brake fluid pressure is supplied by the pump 7. When it becomes necessary to rapidly increase brake pressure and to compensate for decrease in viscosity of brake fluid due to temperature drop, fluid pressure is supplied to the wheel cylinders 2 both from the pump 7 and the master cylinder 1.

Fluid pressure can be supplied from the master cylinder by opening the on-off valve 3. But when it is repeatedly opened and closed, pulsation occurs in the brake lines. It also occurs while the pump 7 is activated. Such pulsation is transmitted to the brake pedal, thus impairing the brake feeling. If the on-off valve 3 is kept open, the brake pedal will kick back when the wheel cylinder pressure exceeds the master cylinder pressure (that is, fluid pressure produced in the master cylinder).

To solve these problems, the brake system of FIG. 7 has the bypass 10 provided with the on-off valve 11 to supply fluid pressure from the master cylinder 1 via the pump 7. But this modification posed another problem. That is, since the on-off valve 11 has to be opened in order to rapidly increase pressure, the check valve 12 is closed, so that fluid cannot be supplied to the pump 7 from the reservoir 8. Thus, a large amount of fluid has to be supplied from the master cylinder. This significantly increases the stroke of the brake pedal 17 compared with when the on-off valve 11 is closed for increase in the brake pressure at a moderate rate.

Further, while the valve 11 is open for rapid pressure increase, the pump sucks fluid discontinuously from the master cylinder. Pulsation in the brake lines is thus directly transferred to the brake pedal. Although the throttle 15 provided at the discharge side of the pump will suppress pulsation and noise, it makes it difficult to increase fluid pressure at a rapid rate.

An object of this invention is to provide a hydraulic pressure brake system that can eliminate a delay in the pressure rise during a rapid pressure increase and worsening of the pedal feeling, and in which the responsiveness is improved by increasing the suction efficiency of the pump during a rapid pressure increase or at a low temperature.

SUMMARY OF THE INVENTION

According to the invention, there is provided an automotive hydraulic pressure brake system comprising a master cylinder for producing fluid pressure corresponding to a force applied to a brake pedal, a reservoir, wheel cylinders, a power pump having an inlet port connected to the reservoir, an on-off valve provided in a fluid line connecting the master cylinder to the wheel cylinders, the on-off valve being closed to supply brake fluid pressure to the wheel cylinders from the pump while an electric control unit of the system is functioning normally, characterised in that a bypass communicating the master cylinder to the wheel brake cylinders while bypassing the on-off valve is provided, and a check valve or a relief valve for allowing only a fluid flow from the master cylinder toward the wheel brake cylinders, and a shut-off valve are provided in the bypass. (This is a first embodiment.)

Also, with the system of FIG. 7, the fluid discharged from the back-pressure chamber of the stroke simulator is returned to the reservoir without being utilized effectively.

According to the invention, there is also provided an automotive fluid pressure brake system comprising a master cylinder for producing fluid pressure corresponding to a force applied to a brake pedal, a reservoir, wheel cylinders, a power pump having an inlet port connected to the reservoir, an on-off valve provided in a fluid line connecting the master cylinder to the wheel cylinders, a stroke simulator having a main chamber communicating with a line connecting the master cylinder to the on-off valve and a back-pressure chamber communicating with the reservoir, the on-off valve being closed to supply brake fluid pressure to the wheel brake cylinders from the pump while an electric control unit of the system is functioning normally, characterized in that a throttle is provided in a circuit connecting the back-pressure chamber of the stroke simulator to the reservoir, that the system further comprises a first suction passage extending from a circuit between the throttle and the back-pressure chamber to the suction port of the pump, and a second suction passage communicating the reservoir with the first suction passage, and a check valve provided in the second suction passage to allow only a fluid flow from the reservoir toward the pump. (This is a second embodiment.)

If a bypass having a check valve or a relief valve and a shut-off valve provided in the system of the first embodiment is added to the system of the second embodiment, it will be a more preferable system (this system is a third embodiment).

If as in the system of FIG. 7, a throttle 15 is provided in the systems of the first and third embodiments on the discharge side of the pump, the bypass is preferably provided in a circuit between the throttle and the wheel cylinders.

As the stroke simulator in the system of the second or third embodiment, if one is employed which can amplify the amount of fluid flowing out of its back-pressure chamber relative to the amount of fluid flowing into its main chamber, it is possible to further increase the effect of this invention.

In the brake system of the first embodiment, if the brake pressure has to be increased rapidly but the pump alone cannot supply the brake pressure at a required speed, the ECU opens the shut-off valve in the bypass to supply master cylinder pressure through the bypass to the wheel cylinders. In addition to that, the entire fluid sucked by the pump from the reservoir is supplied to the wheel cylinders, so that delay in the pressure increase is minimized.

Since the check valve in the bypass closes when the wheel cylinder pressure exceeds the master cylinder pressure, there is no need to repeatedly open and close the shut-off valve, so that the pedal feeling will not worsen. Also, since the check valve in the bypass closes, the kick-back of the pedal is prevented while the wheel cylinder pressure is increasing. Further, since fluid replenishment from the master cylinder stops at the moment when the check valve closes, the pedal stroke is suppressed.

If a relief valve, which opens when a predetermined differential pressure is produced, is used instead of a check valve, pulsation due to activation of the pump will be less liable to be transferred. This further improves the pedal feeling.

With the system in which a throttle is provided in the discharge circuit of the pump, if make-up fluid from the master cylinder is introduced into a circuit between the throttle and the pump, the degree of improvement in the responsiveness upon sharp pressure increase will decrease due to the influence of the throttle. Thus, fluid supply from the master cylinder is preferably guided into a circuit between the throttle and the wheel cylinders.

When the brake pedal is depressed, fluid discharged from the master cylinder will flow into the main chamber of the stroke simulator. This causes brake fluid to be discharged out of the back-pressure chamber of the stroke simulator. In the system of FIG. 7, the discharged fluid flows into the reservoir without being used effectively.

In contrast, in the brake system of the second embodiment, by the action of the throttle provided between the back-pressure chamber and the reservoir, the higher the viscosity of brake fluid, and the sharper the depressing of the brake pedal and thus the larger the amount of discharged flow from the back-pressure chamber per unit time, the larger the fluid pressure in the circuit upstream of the throttle. The circuit upstream of the throttle is connected to the suction port of the pump through the first suction passage. Thus, during a rapid pressure increase or at a low temperature causing low viscosity of brake fluid, pressurized brake fluid is pushed in while the pump is working, so that the suction efficiency of the pump improves. This prevents a delay in pressure increase during sharp pressure increase or at a low temperature.

Also, in this arrangement, since a throttle is inexpensive compared with the on-off valve 11 in the system of FIG. 7, an increase in the cost is avoided. Further, while with the system of FIG. 7, fluid is supplied to the pump from the master cylinder while the on-off valve 11 is open, with the system of the second embodiment, when the pressure in the first suction passage drops due to sucking of fluid by the pump and partial flow-out of fluid via the throttle, the check valve in the second suction passage opens, so that sucking of fluid by the pump is carried out from the reservoir. Thus, the pedal stroke during sharp pressure increase will not increase extremely compared with during moderate pressure increase.

If a fluid amount amplifier is used as the stroke simulator, the amount of fluid discharged from the back-pressure chamber increases above the amount of fluid flowing into the main chamber, so that the suction efficiency of the pump further improves. This further reduces the stroke of the pedal.

The brake system of the third embodiment exhibits the functions and effects of both of the systems of the first and second embodiments, so that the pressure increase is faster.

Other features and objects of the present invention will become apparent from the following description made with reference to the accompanying drawings, in which:

DETAILED DESCRIPTION OF THE PREFERRED EMBODIMENT

Figure 1:
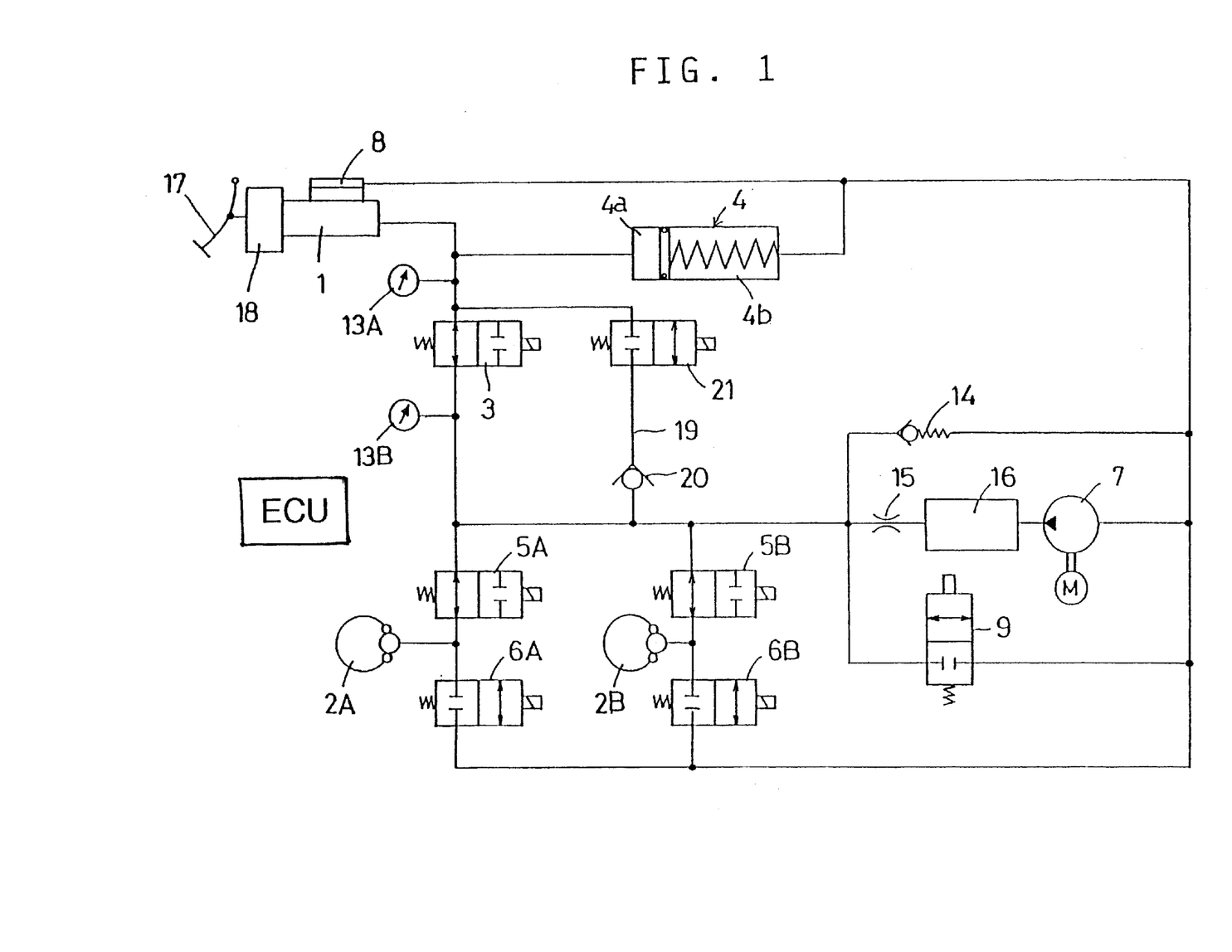
FIG. 1 is a circuit diagram showing a fluid pressure brake system of a first embodiment.

FIG. 1 shows an automotive hydraulic pressure brake system of the first embodiment. Two brake fluid circuits are usually separately mounted on a vehicle, each for two of the four wheel brake cylinders. FIG. 1 shows one of two circuits. The wheel brake cylinders 2A, 2B shown may be for the front right and left wheels, rear right and left wheels, front left and rear right wheels, or front right and rear left wheels.

The master cylinder pressure, which depends on the force applied to the brake pedal 17 by the driver, is directly supplied to the wheel cylinders if the electric control system fails. A booster 18 proportionally amplifies the master cylinder pressure so that a sufficient brake pressure can be produced with a small effort on the part of the driver even in such a case.

Since the brake system of FIG. 1 is a modification of the system of FIG. 7, like elements are denoted by like symbols and detailed description will be omitted.

Check valves are provided at the discharge and suction sides of the pump 7 to prevent reverse flow of fluid to the reservoir 8 and reverse flow from the wheel cylinder 2 to the pump 7, respectively. In the embodiment shown, such check valves are not shown.

In the embodiment of FIG. 1, instead of the bypass 10 of FIG. 7, a bypass 19 is provided to connect the master cylinder 1 to the wheel cylinders 2 while bypassing the on-off valve 3, and instead of the on-off valve 11, a check valve 20 that permits only a fluid flow from the master cylinder 1 to the wheel cylinders 2 and a shut-off valve 21 (such as an electromagnetic on-off valve as shown) are provided in the bypass 19. The system of FIG. 1 differs from that of FIG. 7 in these points.

In operation, when the brake pedal 17 is depressed, the ECU closes the on-off valve 3 and activates the pump 7 based on the signal from a brake switch (not shown) and/or a pressure sensor 13A. With this arrangement, brake pressure can be controlled in proportion to the force applied to the brake pedal by adjusting the amount of fluid supplied from the pump 7 to the wheel cylinders without the need to directly supply master cylinder pressure to the wheel cylinders. In other words, the vehicle can be braked according to the intention of the driver.

To increase the wheel cylinder pressure, the pump 7 is initially operated at high speed with the on-off valve 9 in the return line closed. Since the on-off valve 3 in the line to the master cylinder 1 is also closed in this state, all fluid from the pump 7 is supplied to the wheel cylinders 2, so that the brake fluid pressure rises quickly. When the output of pressure sensor 13B provided in the line connecting the on-off valve 3 to the wheel cylinders reaches a predetermined pressure, the ECU will slow down or stop the pump 7 and open the on-off valve 9 if necessary.

While fluid pressure is produced in the master cylinder 1 in proportion to the force applied to the brake pedal, since the on-off valve 3 is kept shut, the master cylinder pressure is not supplied to the wheel cylinders through the valve 3. Thus, any pulsation in the brake lines would not be transmitted to the the brake pedal. Good pedal feeling is thus assured.

But when it is necessary to increase the brake pressure at a rapid pace in response to sharp depressing of the brake pedal or delay in pressure increase due to slow operation of the pump, the ECU will judge that the pump 7 alone cannot increase brake pressure to the required level, and open the shut-off valve 21 in the bypass 19 to supply brake fluid from the master cylinder 1 directly to the wheel cylinders 2 to prevent delay in pressure increase.

At end of the braking, the ECU will stop the pump and open the on-off valve 9 to return the fluid pressure in the wheel cylinders 2 to the reservoir 8. Although the on-off valves 5 and 6 are provided for antilock control, if necessary, the on-off valve 6 may be opened to return the fluid pressure to the reservoir more quickly to speed up the pressure decrease. Also, in the low-pressure range the on-off valve 3 may be opened to return part of the fluid to the master cylinder 1. It is preferable that as the valve 9, a current-proportional flow control valve (linear valve) is used.

The amount of fluid supplied to the wheel cylinders 2 can be controlled to a value corresponding to the pedal depressing force by e.g. adjusting the revolving speed of the pump 7 or the torque of the pump driving motor and/or by opening and closing the on-off valves 6 and 9 based on the force applied to the brake pedal by the driver and the wheel cylinder pressure as measured by the pressure sensor 13B. Also, by adjusting the opening of the on-off valves 9 and 6 in one of the two brake systems mounted on the vehicle to a different degree from the valves 9, 6 in the other system, it is possible to apply different brake pressures to the wheel cylinders in the respective systems.

The ECU determines whether the pump 7 alone can or cannot increase fluid pressure at a required speed based on the rate of change of the force applied to the brake pedal or change in the master cylinder pressure (it exceeds a predetermined value during panic braking), or based on the difference between the readings on the pressure sensors 13A and 13B. If the ECU determines so, it will open the shut-off valve 21 to increase brake pressure with higher response in the above-described manner. The ECU is ordinarily programmed to close the shut-off valve 21 when the wheel cylinder pressure has increased to a required level by comparing the values of the pressure sensors 13A, 13B. But even if the shut-off valve 21 is kept open, the brake pedal would not kick back because the check valve 20 in the bypass 19 prevents reverse fluid flow.

When the check valve 20 closes with increase in the wheel cylinder pressure, fluid supply from the master cylinder will be stopped. Thus the stroke of the brake pedal 17 can not be too large and rapid pressure increase is possible while keeping good pedal feeling.

The brake system of FIG. 1 is provided with on-off valves 5, 6 and 9 for controlling the wheel cylinder pressure and pressure sensors 13A and 13B for detecting the master cylinder pressure and the fluid pressure at the discharge side of the pump, respectively.

By adding a brake switch (not shown) and wheel speed sensors (not shown) to the system shown and suitably programming the ECU, this brake system can perform various controls as listed below:
1) controlling the pressure supplied from the pump to the wheel cylinder in proportion to the stroke of the brake pedal (or the force applied to the brake pedal);
2) antilock brake control;
3) automatic braking or traction control performed by automatically applying braking pressure to selected wheel brakes while the brake pedal is not depressed, to adjust the attitude of the vehicle or decelerate the vehicle;
4) regenerative braking control in an electric vehicle for reducing the brake pressure while the vehicle electric motor is being used as an additional brake while generating electricity;
5) brake-assist control for amplifying the braking force during panic braking beyond a value corresponding to the pedal treading force; and
6) EBD control for optimally distributing braking forces to the front and rear wheels.

Figure 2:
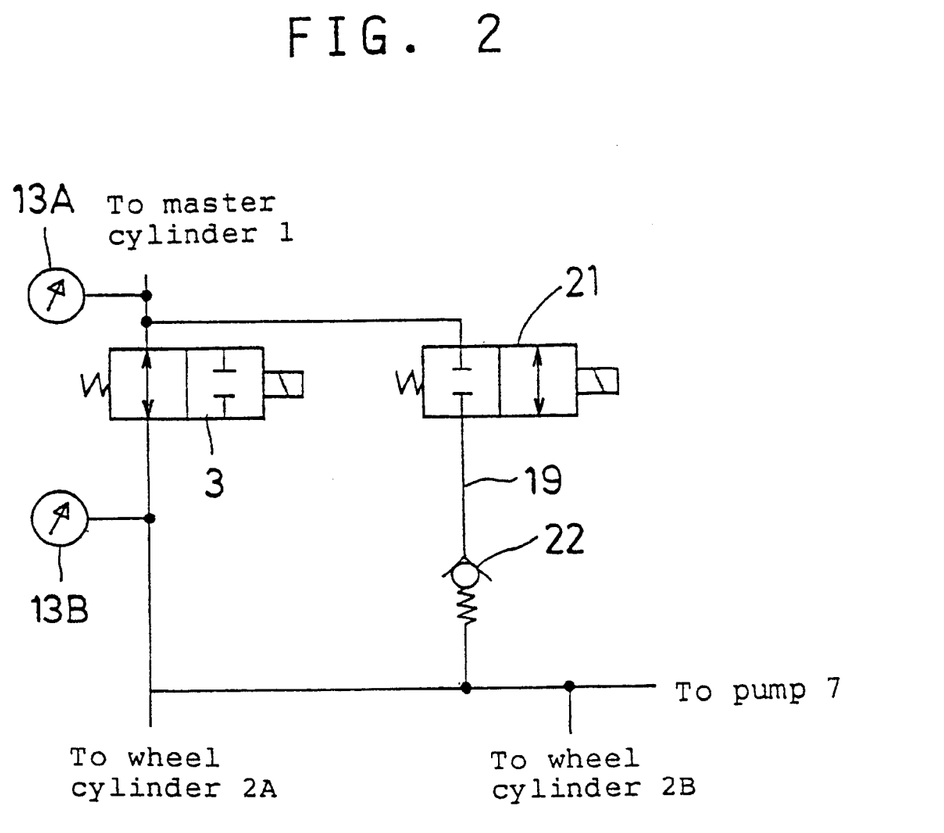
FIG. 2 is a view showing an example in which the check valve in the bypass is replaced with a relief valve.

The check valve 20 in FIG. 1 may be replaced with a relief valve 22 shown in FIG. 2 because the latter is kept closed until the difference in fluid pressure on master cylinder side and pump side exceeds a predetermined value (e.g. 10 bar) and thus can more effectively suppress transmission of pulsation to the brake pedal than a check valve which reacts pressure change. sensitively. The use of a relief valve further improves the pedal feeling upon sharp pressure increase.

In certain circumstances, the shut-off valve 21 may be omitted by setting the valve-opening differential pressure for the relief valve at a relatively large value (e.g. 20 bar or over).

Also, as shown in FIG. 1, if the throttle 15 is provided in the discharge circuit of the pump to reduce noise due to pulsation by damping pulsation, the, bypass 19 is preferably connected to the circuit nearer to the wheel cylinders than the throttle. With this arrangement, the influence of the throttle will disappear, so that the effect of improvement in responsiveness during a sharp pressure increase will reveal to the maximum.

While it has been described that the on-off valve 3 may be controlled by a signal from a brake switch and/or the pressure sensor 13A, a signal from a stroke sensor for detecting the stroke of the brake pedal may be used.

Figure 3:
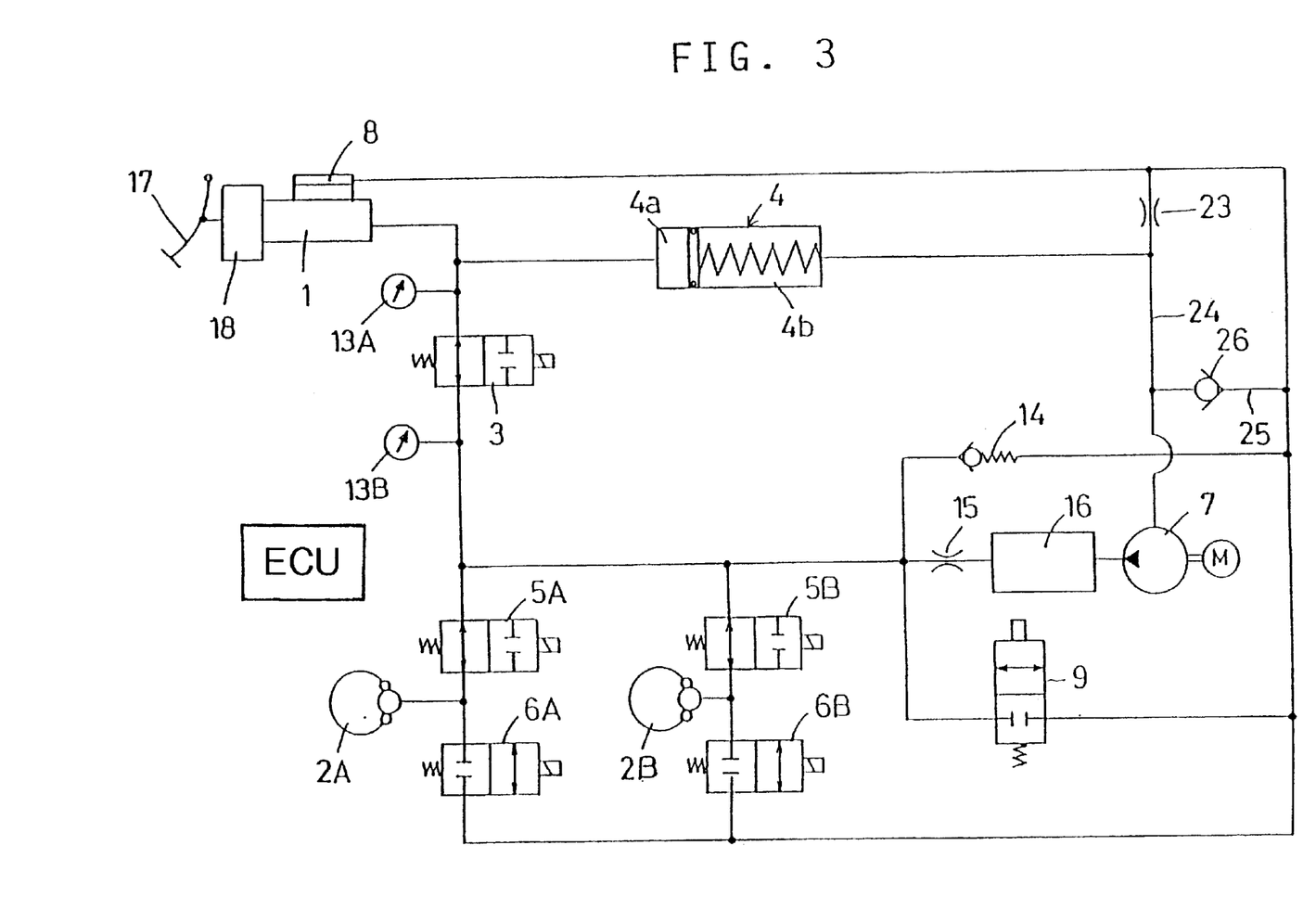
FIG. 3 is a circuit diagram showing a fluid pressure brake system of a second embodiment.

FIG. 3 is a circuit diagram of the brake system of the second embodiment.

In the brake system of FIG. 3, instead of the bypass 10 and the on-off valve 11 of the system of FIG. 7, a throttle 23 is provided in the circuit connecting the back-pressure chamber 4b of the stroke simulator 4 to the reservoir 8. Also, a first suction passage 24 extending from a point between the throttle 23 and the back-pressure chamber 4b to the suction port of the pump 7, and a second suction passage 25 for communicating the reservoir 8 with the first suction passage 24 are provided, and a check valve that allows only a fluid flow from the reservoir 8 toward the pump 7 is provided in the second suction passage 24. In these points, it differs from the brake system of FIG. 7.

With the brake system of FIG. 3 too, when the brake pedal is depressed, the on-off valve is closed to revolve the pump 7 and thus to increase pressure of the wheel cylinders 2 by the fluid from the pump. Since control at this time and how to adjust the amount of supply fluid are substantially the same as the system of FIG. 1, description is omitted. The only difference from the system of FIG. 1 is that in order to prevent a delay in pressure increase of the wheel cylinders 2 during a sharp braking or at a low temperature when the viscosity of the brake fluid increases, the pressure in the first suction passage 24 is increased due to the throttling effect of the throttle 23, thereby improving the suction efficiency of the pump 7. If the pressure in the first suction passage 24 drops or if no pressure rise occurs in the first suction passage 24 by e.g. moderate pressure increase, the check valve 26 in the second suction passage 25 will open, so that fluid will be sucked by the pump 7 from the reservoir 8.

The system of FIG. 7 determines whether or not the discharge amount of the pump is insufficient based on whether or not the rate of change in the operating force by the driver or the master cylinder has exceeded a predetermined value (in the case of sharp braking, the rate of change is large), and it was necessary to open the on-off valve 11 if the discharge amount of the pump is judged to be insufficient. The system of FIG. 3 needs no such function. It is only necessary to suitably design the degree of opening of the throttle 23. It is easier to control.

The operation at the end of braking is also the same as in the system of FIG. 1. With the brake system of FIG. 3 too, by providing a brake switch, an electronic control unit and wheel speed sensors, it is possible to perform various controls 1) to 4) and 6) among the above-listed control types.

Figure 4A:
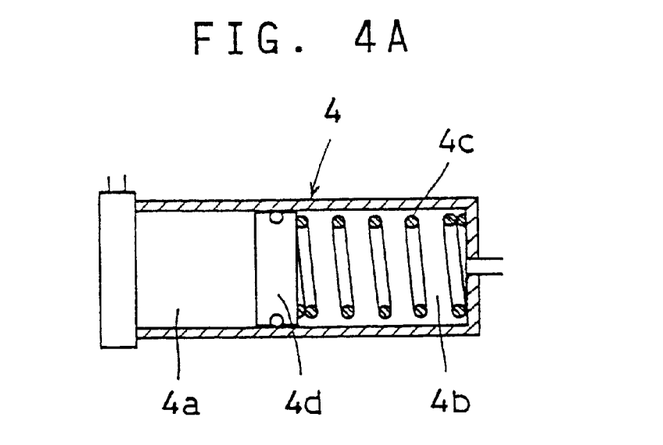
FIG. 4A is a sectional view showing an example of the stroke simulator.
Figure 4B:
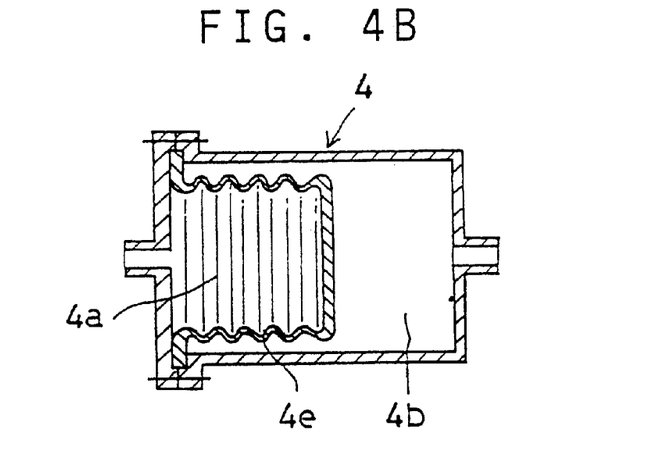
FIG. 4B is a sectional view showing another example of the same.

FIGS. 4A, 4B show specific examples of the stroke simulator 4. FIG. 4A shows one in which the main chamber 4a communicating with the master cylinder 1, and the back-pressure chamber 4b communicating with the reservoir 8 are partitioned by a piston 4d biased by a spring 4c. FIG. 4B shows one in which the main chamber 4a and the back-pressure chamber 4b are partitioned by a stretchable bellows piston 4e to impart a tredding reaction force to the brake pedal using the resilient restoring force of the bellows piston 4e. The position of the main chamber 4a and the back-pressure chamber 4b may be reversed. Any other stroke simulator may also be employed.

Figure 5:
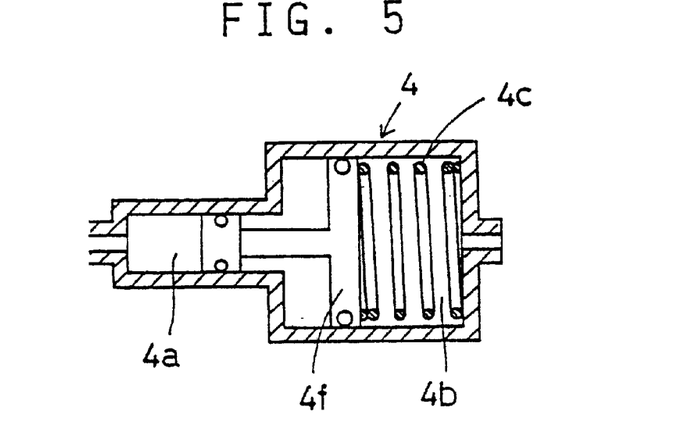
FIG. 5 is a sectional view of a stroke simulator using a fluid amount amplifier.

FIG. 5 is a specific example of the stroke simulator having a fluid amount amplifying function. The main chamber 4a and the back-pressure chamber 4b are partitioned by a different-diameter piston 4f biased by a spring 4c. Fluid amount is amplified in proportion to the ratio between the pressure-receiving surface areas at both ends of the different-diameter piston 4f. The amplified fluid amount is supplied into the pump, so that it is possible to further reduce the push-in of the brake pedal.

Figure 6:
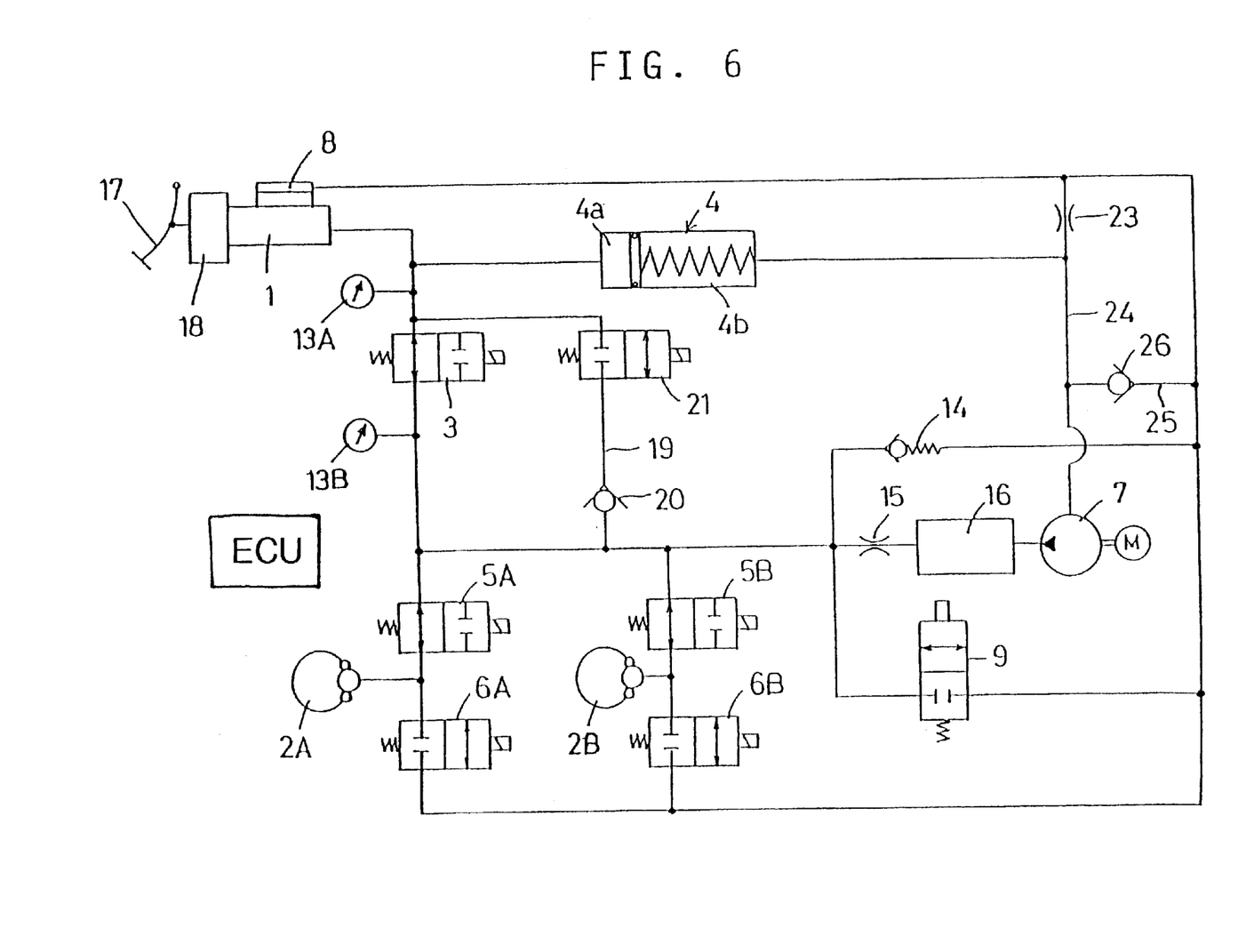
FIG. 6 is a circuit diagram showing a fluid pressure brake system of a third embodiment.

FIG. 6 is a circuit diagram of the brake system of the third embodiment. In the system of FIG. 6, a bypass 19 is provided to communicate the master cylinder 1 and the wheel cylinders 2 with each other while bypassing the on-off valve 3, and a check valve 20 that permits only a fluid flow from the master cylinder 1 toward the wheel cylinders 2 and a shut-off valve 21 (an electromagnetically driven on-off valve in the figure) are provided in the bypass 19. Also, there are provided a throttle 23 in the circuit connecting the back-pressure chamber 4b of the stroke simulator 4 to the reservoir 8, a first suction passage 24 extending from a point between the throttle 23 and the back-pressure chamber 4b to the suction port of the pump 7, a second suction passage 25 that communicates the reservoir 8 with the first suction passage 24, and a check valve 26 that permits only a fluid flow from the reservoir 8 toward the pump 7 in the second suction passage 25.

This system is a combination of the system of FIG. 1 and that of FIG. 3. Thus, it reveals both of the functions and effects of the system of FIG. 1 and those of the system of FIG. 3. During a rapid pressure increase, the throttle 23 works to feed fluid discharged from the stroke simulator 4 into the pump 7, and the bypass 19 also opens. Thus, fluid from the master cylinder 1 is added to the entire amount of discharged fluid from the pump 7, of which the suction efficiency has increased, and is supplied to the wheel cylinders 2. Thus a pressure rise of the wheel cylinders 2 is further sped up and the response improves.

Like the systems of FIGS. 1 and 3, the brake system of FIG. 6 can perform various controls.

In the system of FIG. 6 too, if a relief valve, which opens when a predetermined fluid pressure difference is produced, is used as the check valve 20, it is possible to further reduce the chance of pulsation produced by the pump being transmitted to the brake pedal.

Also, as the stroke simulator, if one in which the amount of discharged fluid from the back-pressure chamber 4b is amplified relative to the amount of fluid from the master cylinder 1, which is introduced into the main chamber 4a, (the fluid amount can be amplified by use of the amplifier of FIG. 5 or a known fluid amount amplifier) is used, the suction efficiency of the pump further increases and the amount of fluid replenishment from the master cylinder decreases. Thus, it is possible to further reduce the push-in of the brake pedal.

As has been described above, in the brake system of the first embodiment, during a rapid pressure increase when the supply of fluid pressure is insufficient with the pump alone, brake fluid replenished from the master cylinder to the wheel cylinders is introduced to the discharge side of the pump through the bypass having a check valve and a shut-off valve. Thus it is possible to reduce the push-in of the brake pedal during a rapid pressure increase and prevent kick-back of the pedal due to reverse flow of fluid pressure and pedal vibration due to repeated opening and closing of the shut-off valve. A good pedal feeling is thus assured.

Also, during a rapid pressure increase, the entire amount of the discharged fluid from the pump is effectively used, and fluid replenished from the master cylinder is added thereto. Thus, the rise of the wheel cylinder pressure is rapid and the responsiveness further improves. This further improves the performance and reliability of a small fluid pressure brake system which uses a pump having a small capacity and which does not include an accumulator.

In the brake system of the second embodiment, discharge resistance is applied by an inexpensive throttle to brake fluid discharged from the back-pressure chamber of a stroke simulator toward the reservoir, and the pump sucks up brake fluid, of which pressure has been increased by the throttle. Thus, the suction efficiency of the pump improves. This makes it possible to economically avoid a delay in the pressure rise during a rapid pressure increase or at a low temperature.

When the pressure in the second suction passage drops, the source from which brake fluid is sucked up by the pump is changed over to the reservoir, so that the pedal stroke during a rapid pressure increase will not increase markedly compared with during a moderate pressure increase. Furthermore, if a fluid amount amplifier is used as the stroke simulator, it is possible to further reduce the push-in of the brake pedal.

In the brake system of the third embodiment, the function and effects of both of the systems of the first and second embodiments are obtained. Thus higher response can be assured with a small system.

The present disclosure relates to subject matter contained in priority Japanese Patent Application Nos. HEI 11-332495, filed on Nov. 24, 1999, HEI 11-332652, filed on Nov. 24, 1999, HEI 11-332660, filed on Nov. 24, 1999, 2000-256682, filed on Aug. 28, 2000, 2000-256697, filed on Aug. 28, 2000, and 2000-256763, filed on Aug. 28, 2000, the contents of all of which are herein expressly incorporated by reference in their entireties.

What I claim:

1. An automotive hydraulic pressure brake system comprising a master cylinder for producing hydraulic pressure corresponding to a force applied to a brake pedal, a reservoir, wheel cylinders, a pump having a suction port connected to said reservoir through a first fluid line and an outlet port connected to said wheel cylinders through a second fluid line, an electric power source for supplying electric power to said pump, an on-off valve provided in a third fluid line connecting said master cylinder to said wheel cylinders, said second fluid line being connected to said third fluid line at a first point between said on-off valve and said wheel cylinders, a bypass line branching from said third fluid line at a second point between said master cylinder and said on-off valve and joining said second fluid line at a third point, a check valve or a relief valve provided in said bypass line for allowing only a fluid flow from said master cylinder toward said wheel cylinders, a shut-off valve provided in said bypass line in series with said check valve or relief valve, and an electronic control unit for keeping said on-off valve closed while said electric power source is functioning normally at least while the brake pedal is being depressed; and wherein said bypass line forms a fluid connection between said master cylinder and said wheel cylinders without passing through said pump.

2. An automotive hydraulic pressure brake system comprising a master cylinder for producing fluid pressure corresponding to a force applied to a brake pedal, a reservoir, wheel cylinders, a power pump having an inlet port connected to said reservoir, an on-off valve provided in a fluid line connecting said master cylinder to said wheel cylinders, a stroke simulator having a main chamber communicating with a line connecting said master cylinder to said on-off valve and a back-pressure chamber communicating with said reservoir, said on-off valve being closed to supply brake fluid pressure to said wheel brake cylinders from said pump while an electric control unit of the system is functioning normally, characterized in that a throttle is provided in a circuit connecting said back-pressure chamber of said stroke simulator to said reservoir, that said system further comprises a first suction passage extending from a circuit between said throttle and said back-pressure chamber to the suction port of said pump, and a second suction passage communicating said reservoir with said first suction passage, and a check valve provided in said second suction passage to allow only a fluid flow from said reservoir toward said pump.

3. The automotive hydraulic pressure brake system as claimed in claim 2, wherein a bypass communicating said master cylinder to said wheel brake cylinders while bypassing said on-off valve is provided, and a check valve or a relief valve for allowing only a fluid flow from said master cylinder toward said wheel brake cylinders, and a shut-off valve are provided in said bypass.

4. The automotive hydraulic pressure brake system as claimed in claim 1 further comprising a throttle provided in said second fluid line between the outlet port of said pump and said third point.

5. The automotive hydraulic pressure brake system as claimed in claim 2 wherein a fluid amount amplifier is used as said stroke simulator to amplify the amount of fluid flowing out of said back-pressure chamber of said stroke simulator relative to the amount of fluid flowing into said main chamber of said stroke simulator.

6. The automotive hydraulic pressure brake system as claimed in claim 3 wherein a second throttle is provided in a circuit on the discharge side of said pump, said bypass having one end communicating with a circuit connecting said second throttle and said wheel cylinders.

7. The automotive hydraulic pressure brake system as claimed in claim 3 wherein a fluid amount amplifier is used as said stroke simulator to amplify the amount of fluid flowing out of said back-pressure chamber of said stroke simulator relative to the amount of fluid flowing into said main chamber of said stroke simulator.

8. The automotive hydraulic pressure brake system as claimed in claim 1, wherein said electronic control unit is adapted to detect the pressure in said master cylinder and to close said shut-off valve if the pressure produced by said pump is determined to be sufficient compared with the detected master cylinder pressure and to open said shut-off valve if the pressure produced by said pump is determined to be insufficient compared with the detected master cylinder pressure.

* * * * *